United States Patent
Zhang et al.

(10) Patent No.: US 9,870,408 B2
(45) Date of Patent: *Jan. 16, 2018

(54) SEARCH METHOD AND SYSTEM

(71) Applicant: Alibaba Group Holding Limited, Grand Cayman (KY)

(72) Inventors: Li Zhang, Hangzhou (CN); Jinhui Li, Hangzhou (CN); Ruijie Guo, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 15/246,406

(22) Filed: Aug. 24, 2016

(65) Prior Publication Data

US 2016/0364393 A1    Dec. 15, 2016

Related U.S. Application Data (63) Continuation of application No. 14/037,068, filed on Sep. 25, 2013, now Pat. No. 9,460,158, which is a (Continued)

(30) Foreign Application Priority Data

Nov. 12, 2009 (CN) .......................... 2009 1 0211788

(51) Int. Cl.
*G06F 17/30* (2006.01)

(52) U.S. Cl.
CPC .... *G06F 17/3053* (2013.01); *G06F 17/30554* (2013.01); *G06F 17/30598* (2013.01); *G06F 17/30864* (2013.01)

(58) Field of Classification Search
None
See application file for complete search history.

(56) References Cited

U.S. PATENT DOCUMENTS 4,817,050 A    3/1989 Komatsu et al.
6,167,397 A    12/2000 Jacobson et al.
(Continued)

FOREIGN PATENT DOCUMENTS

JP    S62121576 A    6/1987
JP    2002032401 A    1/2002
(Continued)

OTHER PUBLICATIONS

Chinese Office Action dated May 16, 2012 for Chinese patent applicaton No. 200910211788.X, a counterpart foreign application of U.S. Appl. No. 12/992,399, 10 pages.
(Continued)

*Primary Examiner* — Debbie Le
(74) *Attorney, Agent, or Firm* — Lee & Hayes, PLLC (57) ABSTRACT

A search method is disclosed. The method obtains a plurality of search results for a query based on first relevance scores, and classifies the plurality of search results into a plurality of classifications. Based on respective rankings of the plurality of search results in corresponding classifications of the plurality of classifications, second relevance scores for the plurality of search results are generated, and the plurality of search results are ranked based on the first relevance scores and the second relevance scores. The technique achieves lower consumption of system resources, faster computation speed and more flexibility in diversification of search results.

20 Claims, 7 Drawing Sheets

Related U.S. Application Data continuation of application No. 12/992,399, filed as application No. PCT/US2010/051332 on Oct. 4, 2010, now Pat. No. 8,583,640.

(56) References Cited

U.S. PATENT DOCUMENTS

| | | | |
|---|---|---|---|
| 6,766,316 | B2 | 7/2004 | Caudill et al. |
| 6,785,671 | B1 | 8/2004 | Bailey et al. |
| 6,963,867 | B2 * | 11/2005 | Ford ............... G06F 17/30705 707/752 |
| 7,127,416 | B1 | 10/2006 | Tenorio |
| 7,451,130 | B2 | 11/2008 | Gupta et al. |
| 7,519,595 | B2 | 4/2009 | Solaro et al. |
| 7,523,099 | B1 | 4/2009 | Egnor et al. |
| 7,571,157 | B2 | 8/2009 | Chowdhury et al. |
| 7,617,193 | B2 | 11/2009 | Bitan et al. |
| 7,680,697 | B2 | 3/2010 | Hearn et al. |
| 7,765,227 | B1 | 7/2010 | Khoshnevisan et al. |
| 7,814,099 | B2 | 10/2010 | Wang |
| 7,904,975 | B2 | 3/2011 | Kruglikov et al. |
| 7,921,106 | B2 | 4/2011 | Chen et al. |
| 7,958,126 | B2 * | 6/2011 | Schachter ......... G06F 17/30867 707/748 |
| 7,962,477 | B2 * | 6/2011 | Hu ................... G06F 17/30864 707/706 |
| 8,005,819 | B2 | 8/2011 | Vailaya et al. |
| 3,060,456 | A1 | 11/2011 | Gao et al. |
| 8,180,768 | B2 | 5/2012 | Ceri et al. |
| 8,332,428 | B2 | 12/2012 | Bonneau et al. |
| 8,341,147 | B2 | 12/2012 | Hu et al. |
| 8,352,454 | B2 | 1/2013 | Falk et al. |
| 8,364,670 | B2 | 1/2013 | Peckover |
| 8,370,332 | B2 | 2/2013 | Hu et al. |
| 8,407,229 | B2 | 3/2013 | Yang et al. |
| 8,463,805 | B2 | 6/2013 | Osborn et al. |
| 8,468,083 | B1 * | 6/2013 | Szulczewski ......... G06Q 30/02 705/36 R |
| 8,583,640 | B2 | 11/2013 | Zhang et al. |
| 8,626,604 | B1 | 1/2014 | Gandhi |
| 8,626,784 | B2 | 1/2014 | Beaudreau et al. |
| 8,788,371 | B2 | 7/2014 | Parikh et al. |
| 9,009,164 | B2 | 4/2015 | Schachter |
| 9,031,942 | B2 | 5/2015 | Larsson et al. |
| 2003/0195877 | A1 | 10/2003 | Ford et al. |
| 2003/0220895 | A1 | 11/2003 | Vailaya |
| 2004/0030690 | A1 | 2/2004 | Teng et al. |
| 2004/0093321 | A1 | 5/2004 | Roustant et al. |
| 2004/0210491 | A1 | 10/2004 | Sadri |
| 2004/0215607 | A1 | 10/2004 | Travis, Jr. |
| 2005/0010484 | A1 | 1/2005 | Bohannon et al. |
| 2005/0027694 | A1 | 2/2005 | Sauermann |
| 2005/0050023 | A1 | 3/2005 | Gosse et al. |
| 2005/0289158 | A1 | 12/2005 | Weiss et al. |
| 2006/0004891 | A1 | 1/2006 | Hurst-Hiller et al. |
| 2006/0190425 | A1 | 8/2006 | Chang et al. |
| 2006/0212425 | A1 | 9/2006 | Stam et al. |
| 2006/0287980 | A1 | 12/2006 | Liu et al. |
| 2007/0073607 | A1 | 3/2007 | Eydelman |
| 2007/0078758 | A1 | 4/2007 | Susskind et al. |
| 2007/0083506 | A1 | 4/2007 | Liddell et al. |
| 2007/0294225 | A1 | 12/2007 | Radlinski et al. |
| 2007/0294289 | A1 | 12/2007 | Farrell |
| 2008/0010276 | A1 | 1/2008 | Morton et al. |
| 2008/0033915 | A1 | 2/2008 | Chen et al. |
| 2008/0059429 | A1 | 3/2008 | Kojima et al. |
| 2008/0071742 | A1 | 3/2008 | Yang et al. |
| 2008/0104047 | A1 | 5/2008 | Nagarajayya |
| 2008/0140625 | A1 | 6/2008 | Chang et al. |
| 2008/0140641 | A1 | 6/2008 | Wang |
| 2009/0048943 | A1 | 2/2009 | Hardigree |
| 2009/0083243 | A1 | 3/2009 | Heymans et al. |
| 2009/0125505 | A1 | 5/2009 | Bhalotia et al. |
| 2009/0193003 | A1 | 7/2009 | Heymans et al. |
| 2009/0222485 | A1 | 9/2009 | Wassmann et al. |
| 2010/0017398 | A1 | 1/2010 | Gupta et al. |
| 2010/0030769 | A1 | 2/2010 | Cao et al. |
| 2010/0037161 | A1 | 2/2010 | Stading et al. |
| 2010/0082510 | A1 | 4/2010 | Gao et al. |
| 2010/0082618 | A1 | 4/2010 | Ott, IV et al. |
| 2010/0153405 | A1 | 6/2010 | Johnson et al. |
| 2010/0262602 | A1 | 10/2010 | Dumon et al. |
| 2010/0299222 | A1 | 11/2010 | Hamilton, IV et al. |
| 2011/0029408 | A1 | 2/2011 | Shusterman et al. |
| 2011/0072023 | A1 | 3/2011 | Lu |
| 2011/0082770 | A1 | 4/2011 | Krishnamoorthy et al. |
| 2011/0184883 | A1 | 7/2011 | El-Charif et al. |
| 2012/0078754 | A1 | 3/2012 | Wiseman et al. |
| 2012/0089602 | A1 | 4/2012 | Oliver et al. |
| 2012/0233001 | A1 | 9/2012 | Perkowski |
| 2013/0060755 | A1 | 3/2013 | He et al. |
| 2013/0197971 | A1 | 8/2013 | Wilke |

FOREIGN PATENT DOCUMENTS

| | | |
|---|---|---|
| JP | 2003186912 A | 7/2003 |
| JP | 2005327225 A | 11/2005 |
| JP | 2006527891 A | 12/2006 |
| WO | WO2009048818 | 4/2009 |
| WO | WO2011059595 A1 | 5/2011 |
| WO | WO2013163580 A1 | 10/2013 |

OTHER PUBLICATIONS

Chinese Office Action dated Jun. 6, 2013 for Chinese patent applicaton No. 200910211788.X, a counterpart foreign application of U.S. Appl. No. 12/992,399, 13 pages.

Chinese Office Action dated Dec. 21, 2012 for Chinese patent applicaton No. 200910211788.X, a counterpart foreign application of U.S. Appl. No. 12/992,399, 10 pages.

Translated Japanese Office Action dated Mar. 11, 2014 for Japanese patent application No. 2012-538819, a counterpart foreign application of U.S. Appl. No. 12/992,399, 7 pages.

Mizuno, "Book That Makes You Understand All About Google, First Ed.", Sotechsha Co., Ltd., Japan, Nov. 20, 2007, pp. 59-64.

Office Action dated Jan. 6, 2016 in Japanese Application No. 2015-509194.

Office Action dated Mar. 11, 2016 in U.S. Appl. No. 13/870,696.

Final Office Action for U.S. Appl. No. 12/992,399, dated Apr. 1, 2013, Li Zhang et al., "Search Method and System", 8 pages.

Office Action for U.S. Appl. No. 14/037,068, dated May 21, 2015, Li Zhang, "Search Method and System", 7 pages.

Non-Final Office Action for U.S. Appl. No. 12/992,399, dated Aug. 31, 2012, Li Zhang et al., "Search Method and System", 9 pages.

Office Action dated Sep. 30, 2015 in U.S. Appl. No. 13/870,696.

Office action for U.S. Appl. No. 14/037,068, dated Nov. 19, 2015, Zhang et al., "Search Method and System", 9 pages.

Search Report & Written Opinion dated Oct. 7, 2013 in PCT Application No. PCT/US2013/038463.

* cited by examiner (PRIOR ART)

SEARCH METHOD AND SYSTEM

CROSS REFERENCE TO RELATED PATENT APPLICATIONS

This application is continuation of and claims priority to commonly assigned, co-pending U.S. patent application Ser. No. 14/037,068 filed Sep. 25, 2013, which is a continuation of U.S. patent application Ser. No. 12/992,399, filed on Nov. 12, 2010, the disclosure of which is a national stage application of an international patent application PCT/US10/51332, filed Oct. 4, 2010, which claims priority from Chinese Patent Application No. 200910211788.X filed on Nov. 12, 2009, entitled "SEARCH METHOD AND SYSTEM," which applications are hereby incorporated in their entirety by reference.

TECHNICAL FIELD

The present disclosure relates to the network data processing field, and more particularly relates to a search method and system.

BACKGROUND

In a search process by a search engine, search results may be secondly ranked according to some attributes (such as geography, source, or subject) so that the top n (n>=1) search results present diversity of distribution in terms of those attributes. This is referred to as diversification of search results. In the context of e-commerce search, search results are often ranked according to relevance or time. Thus a supplier would continuously publish information of a given product so this product can occupy top pages of the search results, thereby maliciously depriving the product display opportunity of one or more other suppliers and causing certain troubles to general users who may be attempting to find other products.

To avoid such problem, the current technologies provide a search method to extract and categorize search results based on relevance. The detailed implementation process is as follows: search results are pre-categorized based on relevance, search results with similar relevance scores are classified into a same category, and search results from each category are then extracted. The extraction includes: selecting a field as a basis for diversity, such as uid (a unique identification of supplier) for example. Then the search results would include the products from a diversity of suppliers. In practice, the search results are classified into many sub-sets according to uid score. The search results for the same uid are classified into a same sub-set, and are ranked according to their relevance scores from high to low in the same sub-set. The m (m>=1) most relevant search results in each sub-set are extracted and displayed at top several pages of the search results. Therefore, the search results in the top several pages can include products from different uids, or suppliers.

Figure 1:
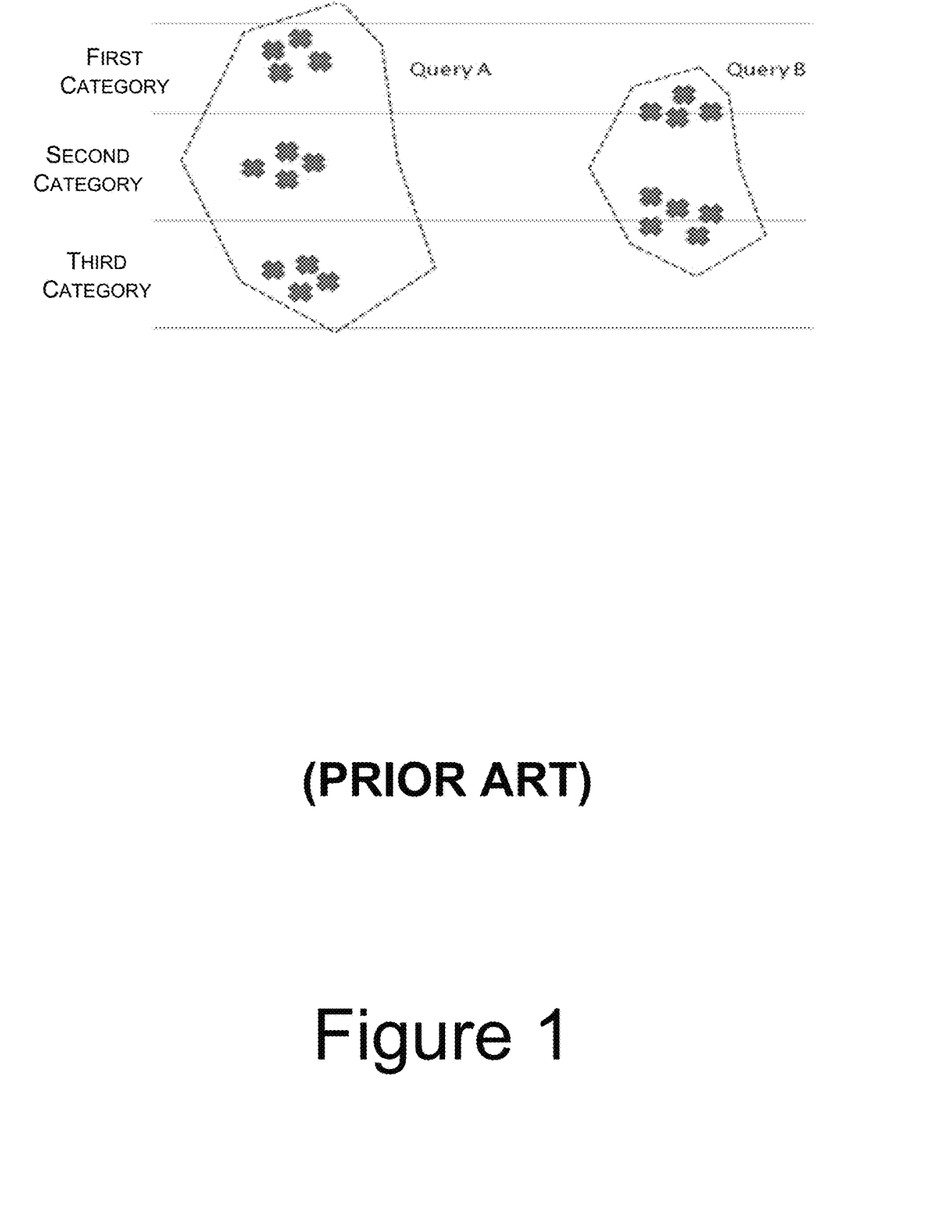
FIG. 1 illustrates an interface diagram of classification in the current technologies.

The above-described process based on the current technologies requires the classification of sub-sets and ranking according to uid. Although such process can implement diversification of search results to a certain extent, the current technologies need to re-organize all of the search results in the extraction and classification process. This requires copying of the search results in the system memory and thus consumes a large volume of resources at the search engine server, such as time and expenditure of hardware systems. This would cause low performance of the search engine. Further, the ranking in each sub-set is in fact not completely necessary. Thus the current technologies also conduct some calculations that may be unnecessary and waste the system resources for such calculation. In addition, although the current technologies use the classification based on relevance to balance the diversity and relevance of the search results to a certain extent, the current technologies cannot use a fixed classification interval to correctly classify all search results. As shown in the FIG. 1, an interval classification may be proper for a query A, and may be improper for a query B. It shows that the search results with similar relativities are classified into the same interval for the query A. However, the search results with similar relevance are not regularly classified into the same interval for the query B. Thus the current technologies lack flexibility.

In general, a pending challenge before one of ordinary person in the prior art is to creatively submit a search method to resolve the problem of over-consuming server resources under the current technologies.

SUMMARY OF THE DISCLOSURE

The present disclosure provides a search method to resolve the problem of low performance of search engine server arising from over-consumption of server resources under the current technologies. Further, the search method can also improve flexibility in searching.

The present disclosure also provides a search system to ensure the implementation and application of the above method.

In one aspect, a search method may comprise: according to query data submitted by a client, obtaining a first search result set of first search results relevant to the query data; according to a first relevance score and a preset diversity field of each first search result in the first search result set, calculating a second relevance score of each first search result, the preset diversity field representing an attribute category of a respective first search result; according to the first relevance score and the second relevance score, generating a relevance parameter score for each first search result; and according to a preset number of second search results and the relevance parameter score, extracting the present number of second search results from the first search result set to display to the client. In one embodiment, calculating the second relevance score of each first search result may comprise: according to the preset diversity field of each first search result in the first search result set, classifying the first search result set to obtain a respective subset corresponding to each respective attribute category of the first search result set; according to the first relevance score in each subset, obtaining a corresponding ranking position of a respective first search result; and according to a preset relationship between the ranking position of the respective first search result and the second relevance score, obtaining the second relevance score of each first search result.

In one embodiment, extracting the preset number of second search results from the first search result set to display to the client may comprise: according to the relevance parameter score, ranking each subset after classification of the first search results; and according to a ranking order, extracting the preset number of second search results respectively from the ranked subsets, the preset number of second search results being a product of a number of diversity values and a number of recurring extractions.

In one embodiment, the method may further comprise: storing the query data, the preset number of second search results, and a corresponding relationship between the query data and the preset number of second search results into a database.

In one embodiment, obtaining the first search result set of first search results relevant to the query data may comprise: according to the first relevance score, conducting a search based on the query data submitted by the client; and according to the preset diversity field, extracting the first search results from search results of the search.

In one embodiment, the method may further comprise: displaying the preset number of second search results to the client.

In one embodiment, generating the relevance parameter score of each first search result may comprise: summing the first relevance score and the second relevance score to provide the relevance parameter score for each first search result.

In another aspect, a search system may comprise: a retrieval unit that, according to query data submitted by a client, obtains a first search result set of first search results relevant to the query data; a calculation unit that, according to a first relevance score and a preset diversity field of each first search result in the first search result set, calculates a second relevance score of each first search result, the preset diversity field representing an attribute category of a respective first search result; a configuration unit that, according to the first relevance score and the second relevance score, generates a relevance parameter score of each first search result; and an extraction unit that, according to a preset number of second search results and the relevance parameter score, extracts the present number of second search results from the first search result set to display to the client.

In one embodiment, the calculation unit may comprise: a first retrieval sub-unit that, according to the preset diversity field, classifies the first search result set to obtain a respective subset corresponding to each respective attribute category of the first search result set; a second retrieval sub-unit that, according to the first relevance score in each subset, obtains a corresponding ranking position of a respective first search result; and a matching unit that, according to a preset relationship between the ranking position of each first search result and the second relevance score, obtains the second relevance score of the respective first search result.

In one embodiment, the extraction unit may comprise: a ranking sub-unit that, according to the relevance parameter score, ranks each first search result; and a first extraction sub-unit that, according to a ranking order, extracts the preset number of second search results from the ranked subsets, the preset number of second search results being a product of a number of diversity values and a number of recurring extractions.

In one embodiment, the system may further comprise: a store unit that stores the query data, the preset number of second search results, and a corresponding relationship between the query data and the preset number of second search results into a database.

In one embodiment, the retrieval unit may comprise: a searching sub-unit that, according to the first relevance score, conducts a search based on the query data submitted by the client; and a second extraction sub-unit that, according to the preset diversity field, extracts first search results from search results of the search.

In one embodiment, the system may further comprise: a display unit that displays the preset number of second search results to the client.

In one embodiment, the configuration unit may sum the first relevance score and the second relevance score to provide the relevance parameter score of each first search result.

Compared with the current technologies, the present disclosure has following advantages:

The present disclosure uses an addition of the first relevance score under the current technologies and the calculated second relevance score as the relevance parameter. The present disclosure uses the relevance parameter to conduct a second extraction of the search results so that the search results are more diversified. Further, the present disclosure also conducts optimization in the diversification process to ensure less consumption of system resources, faster calculation, and more flexibility, thereby improving performance of the search engine server. It is appreciated that not every embodiment of the present disclosure needs to achieve all of the above advantages.

DESCRIPTION OF DRAWINGS

To better illustrate embodiments of the present disclosure or techniques of the current technologies, the following is a brief introduction of Figures to be used in descriptions of the embodiments. The following Figures only relate to some embodiments of the present disclosure. A person of ordinary skill in the art can obtain other figures according to the Figures in the present disclosure without creative efforts.

DETAILED DESCRIPTION

The present disclosure, by reference to the Figures in the drawings, clearly and fully describes techniques in embodiments. The Figures only relate to some embodiments instead of all embodiments of the present disclosure. A person of ordinary skill in the art can obtain other embodiment according to the embodiments in the present disclosure without creative efforts. All such embodiments belong to a protection scope of the present disclosure.

The present disclosure may be used in an environment or in a configuration of universal or specialized computer systems. Examples include a personal computer, a server computer, a handheld device or a portable device, a tablet device, a multi-processor system, and a distributed computing environment including any system or device above.

The present disclosure may be described within a general context of computer-executable instructions executed by a computer, such as a program module. Generally, a program module includes routines, programs, objects, modules, and data structure, etc., for executing specific tasks or implementing specific abstract data types. The present disclosure may also be implemented in a distributed computing environment. In the distributed computing environment, a task may be executed by remote processing devices which are connected through a communication network. In distributed computing environment, the program module may be located in one or more storage media (which include storage devices) of one or more local and/or remote computers.

One of the main ideas of the present disclosure may be summarized below. The current technologies, according to query data submitted by a client, may be used to obtain a first search result set that is relevant to the query data. According to a first relevance score and a preset diversity field of each first search result in the first search result set, a second relevance score of each first search result is calculated. The preset diversity field represents an attribute category of a respective first search result, which is a key step in this inventive concept. According to the first relevance score and the second relevance score, a relevance score of each first search result is generated. Finally, according to a preset number of one or more second search results and the relevance score, the one or more second search results are extracted from the first search result set to be displayed to the client.

Such extracted second search results can show diversification of the search results, and avoid consumption of a lot of resources at the search engine server, such as time and expenditure of hardware systems, thereby improving performance of the search engine server. Further, methods of the present disclosure can also be adapted for distribution of more search result sets, thereby increasing flexibility.

Figure 2:
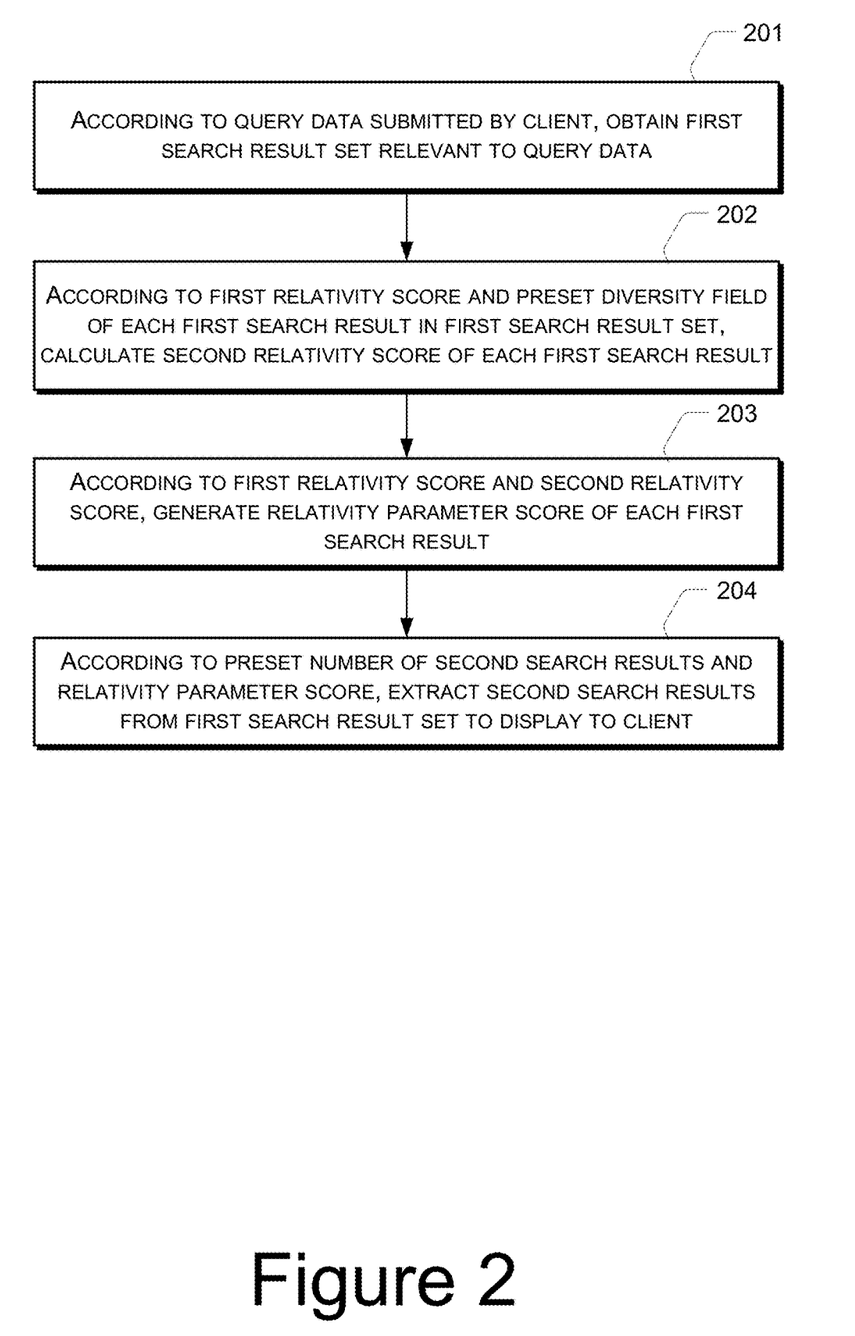
FIG. 2 illustrates an exemplary flowchart of a first embodiment of a search method in accordance with the present disclosure.

FIG. 2 illustrates an exemplary method of a first embodiment in accordance with the present disclosure. The method is described below.

At 201, according to query data submitted by a client, the method obtains a first search result set relevant to the query data.

In the technology field related to search engines, a user's query is usually represented as symbol query, or Query, with a result matching the Query represented as Doc, and a result set matching the Query is a Doc set represented as {Doc}.

In this step, after the client submits the Query, a first step of an internal processing procedure of the search engine server may be to map the Query onto the {Doc}, e.g., Query→{Doc}, wherein the symbol "→" represents mapping. At the meantime, the search engine server calculates the first relevance score (Score 1) for each Doc in the {Doc}. The Score 1 is used to represent the extent of matching between a current Doc and a current Query, e.g., {Doc}→{Doc, Score 1} in a form of symbols. The mapping process is a process that matches search results based on the Query. Any algorithms for relevance can be used to calculate Score 1, such as classical term frequency-inverse document frequency (TF-IDF) algorithm. Some other methods can also be used, such as information gain (IG), mutual information (MI), and entropy.

It is noted that the search engine server can define any algorithm to obtain the first search result. The present disclosure does not limit the search engine server to choose a specific algorithm to obtain the first search result set. Thus, if the algorithm for relevance is different in this step, the first search result obtained afterwards may also be different. This will not influence subsequent steps of the method because the present disclosure targets diversification of the first search result and needs not to restrict the method to obtain the first search result.

At 202, according to a first relevance score and a preset diversity field of each first search result in the first search result set, the method calculates a second relevance score of each first search result, the preset diversity field representing an attribute category of a respective first search result.

After calculation of the Score 1 of each first search result in the first search result set, a second relative score (Score 2) is calculated based on the preset diversity field and the Score 1. The preset diversity field represents the attribute category of the respective first search result, such as a uid (an identification of supplier) of each search result or geographical location information in e-commerce vertical search, for example. The Score 2 is used to represent a score based on the Score 1 and ranking of each first search result under the diversity field. In practical applications, a preset function can be used for the Score 2, and parameters for the preset function are set up as the Score 1 and the ranking position of each first search result. A return value of the function is a value of the Score 2. The setup ranking position in the function has certain association with the Score 2. For example, the higher ranking of the first search result, the higher the value of Score 2 is. Based on different situations, one of ordinary skill in the art would be able to use other associate methods between the ranking position and the Score 2.

At 203, according to the first relevance score and the second relevance score, the method generates a relevance parameter score of each first search result.

The difference between this step and the current technologies is the generation of the relevance parameter score based on the Score 1 and the Score 2 calculated at 202. In one embodiment, the detailed method on generation of the relevance parameter score of each first search result may be as follows: using a sum of the Score 1 and the Score 2 as the relevance parameter score of each first search result; or setting up a weighted value so that the relevance parameter score equals to a sum of the Score 1 and a product of the Score 2 multiplied by the weighted value. For example, assuming the weighted value is 2, the parameter value for relevance=Score 1+2*Score 2. The present disclosure does not restrict how the relevance parameter score of each first search result is generated based on the Score 1 and the Score 2. Any variations according to ideas of the present disclosure are within the protection scope of the present disclosure. In this embodiment, the first search result set is not simply classified according to the Score 1, but is further processed by the new parameter generated by the Score 1 and the Score 2 parameters.

At 204, according to a preset number of one or more second search results and the relevance score, the method extracts the one or more second search results from the first search result set to display to the client.

In this step, assuming the diversity field is preset as uid, the parameters required in this embodiment also include the present number of second search results. The detailed preset number of second search results can be obtained by presetting the number of diversity values and the number of recurring extractions, e.g., by calculating a product of the preset number of diversity values and the number of recurring extractions to obtain the number of second search results to be extracted. The number of diversity values is used to represent the number of first search results with different uids to be extracted in the subsequent extracted second search results. For example, when the number of diversity values is 3, it indicates that 3 search results with different uids are to be extracted. The number of recurring extractions represents the number of second search results to present to the client when the extracted second search results are subsequently displayed to the client. Following the previous example, when the number of recurring extractions is 1, 3 second search results are returned; when the number of recurring extractions is 2, 6 second search results are returned, and so on and so forth. Such extracted second search results include search results related to different uids.

Figure 3:
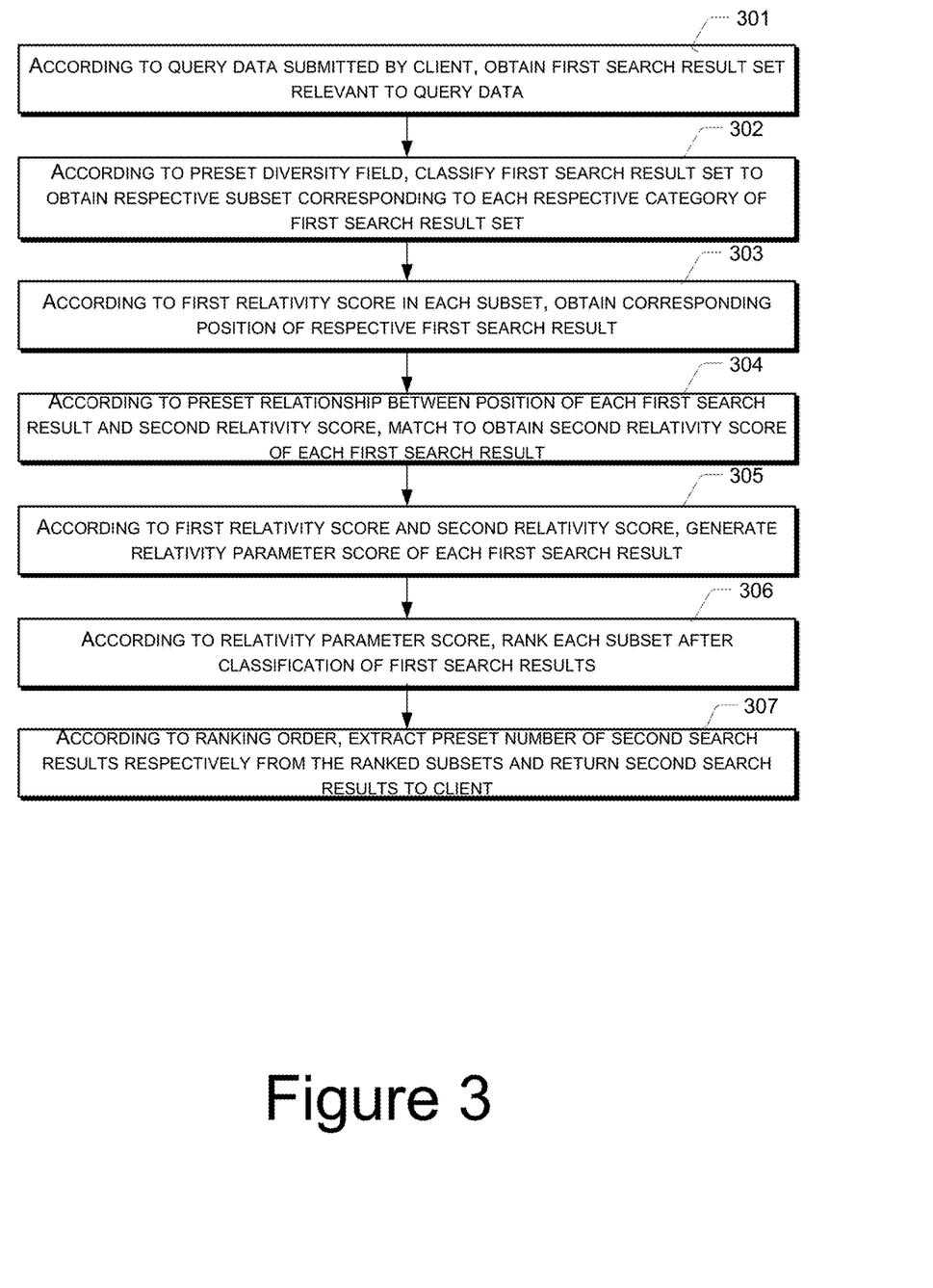
FIG. 3 illustrates an exemplary flowchart of a second embodiment of a search method in accordance with the present disclosure.

FIG. 3 illustrates an exemplary method of a second embodiment in accordance with the present disclosure. The method is described below.

At 301, according to query data submitted by a client, the method obtains a first search result set relevant to the query data.

In practical applications, the present embodiment is applicable when search results of the search engine server have not achieved diversity. In other words, after the obtained first search results are ranked according to the first relevance score, search results with the same attributes are still clustered together. For example, the top several search results from the search engine server are all related a same supplier. After 301, the first search result set is further processed or determined, such as whether the top several results of the first search result set belong to the same category. If the top several results of the first search result set belong to the same category, the subsequent steps may be performed.

At 302, according to a preset diversity field, the method classifies the first search result set to obtain a respective subset corresponding to each respective category of the first search result set.

In this embodiment, assuming the received preset diversity field is uid, as shown in the Table 1 below, the diversity field uid has three values {A, B, C}. In this embodiment, the first search result set {Doc}'s sub-sets relating to uid include {A1, A2, A3}, {B1, B2, B3}, and {C1, C2, C3}. The uid of A1~A3 is A and A1~A3 are search results for supplier A. The uid of B1~B3 is B and B1~B3 are search results for supplier B. The uid of C1~C3 is C and C1~C3 are search results for supplier C.

At 303, according to a first relevance score of each subset, the method obtains a corresponding position of a first search result.

In this embodiment, the first search results in each subset are ranking according to the Score 1. As shown in the Table 1, Table 1 shows a first search result set {Doc} and the corresponding uid and first relevance score (Score 1) of each Doc.

TABLE 1

|  | Search Result | | | | | | | | |
|---|---|---|---|---|---|---|---|---|---|
|  | A1 | A2 | A3 | B1 | B2 | B3 | C1 | C2 | C3 |
| Score 1 | 300 | 250 | 200 | 150 | 100 | 50 | 40 | 30 | 20 |
| uid | A | A | A | B | B | B | C | C | C |

At 304, according to a preset relationship between a second relevance score and a position of each of the first search results in each subset, the method conducts a match to obtain the second reality score of each of the first search results.

In practical applications, the relationship between the position of each of the first search results in each subset and the Score 2 can be represented by a preset function. For example, the second relevance score of a respective first search result can be obtained by calculation of the preset retrieval function of the second relevance score. The parameters of the retrieval functions are the position of each of the first search results after classification in each subset and the second relevance score. The relationship between the position of each of the first search results in each subset and the second relevance score can be understood as the relationship between the position of a respective search result in each subset after ranking according to the first relevance score and classification according to the diversity field and the second relevance score. Such relationship can be represented by the function f(Position, Score 1). Such function can be adapted to any form and content depending upon the user's need or actual situation. The present disclosure does not limit the detailed implementation of the form of the function. For example, in practice an example of the function is shown as follows:

```
float f (int position, float score) {
if (position == 1)
return 300.0f;
else
return 0.0f;
}
```

The meaning of the above function is that when the ranking position of the first search result in the subset is 1, then 300 is returned or the Score 2 value is 300, and the Score 2 is 0 for the first search result with the other ranking positions.

At 305, according to the first relevance score and the second relevance score, the method generates a relevance parameter score of each first search result in the subset.

In one embodiment, a detailed method under the present disclosure for generation of the relevance parameter score of each first search result may include: using a sum of the second relevance score obtained at 304 and the first relevance score of the first search result as the relevance parameter score of each first search result. Table 2 below illustrates the first relevance score, the second relevance score, and the relevance parameter score of each first search result in the subset. The present disclosure does not restrict how the relevance parameter score is generated. Any simple variations according to ideas of the present disclosure are within the protection scope of the present disclosure.

TABLE 2

|  | Search Result | | | | | | | | |
|---|---|---|---|---|---|---|---|---|---|
|  | A1 | A2 | A3 | B1 | B2 | B3 | C1 | C2 | C3 |
| Score1 | 300 | 250 | 200 | 150 | 100 | 50 | 40 | 30 | 20 |
| Score2 | 300 | 0 | 0 | 300 | 0 | 0 | 300 | 0 | 0 |
| Score1 + Score2 | 600 | 250 | 200 | 450 | 100 | 50 | 340 | 30 | 20 |

At 306, according to the relevance parameter score, the method ranks the subset after classification of the first search results.

Each subset after classification of the first search results is ranked according to the new parameter score obtained at 305. A new order of each search result in each subset is obtained after the new ranking. In this embodiment, after new ranking of the first search results, the top three of each subset are A1, B1, and C1.

At 307, according to a ranking order, the method extracts a preset number of second search results from the ranked subset, and returns the second search results to the client.

The preset number of second search results can be obtained by presetting the number of diversity values and the number of recurring extractions, e.g., by calculating a product of the preset number of diversity values and the number of recurring extractions to obtain the number of second search results to be extracted.

The diversity field is used to present an attribute of the first search result. The diversity field value represents the value of the attribute of the first search result. In this embodiment, the diversity field is uid, the diversity values are A, B, and C. The first search results can be classified into three subsets, e.g., A, B, and C, according to the diversity field. The number of second search results to be extracted can be directly preset, or obtained by presetting the number of diversity values and the number of recurring extractions. The number of diversity values is used to represent the number of first search results with different uids to be extracted in the subsequent extracted second search results. For example, when the number of diversity values is 3, it represents extracting 3 first search results for respective A, B, and C suppliers. In this embodiment, the extraction of second search results can also be based on the number of recurring extractions. The number of recurring extractions represents the number of second search results to be recurrently extracted for each category. For example, in this embodiment, the number of recurring extractions (distinct_times) can be understood that when the number of recurring extractions is 1, then only 3 are extracted from each supplier's search results as the second search results, and when the recurring extraction time is 2, 6 (=3*2) are extracted from each supplier's search results as the second search results. The extraction method in the case when the number of extractions is 2 is the same as the method when the number of extractions is 1, and so on.

If the second search results are extracted according to a setting that distinct_count=1 and distinct_times=1, the finally obtained second search results are A1~B1~C1. If the second search results are extracted according to a setting that distinct_count=1 and distinct_times=3, the finally obtained second search results are A1~B1~C1~A2~A3~B2~B3~C2~C3. A person of ordinary skill in the art can achieve different diversified effects by setting different distinct_count, distinct_times, and f(Position, Score 1), thereby achieving a balance between the diversification of the search results and the relevance.

The method as illustrated in this embodiment shows that the top three records of the second search results include three search results the uid of which is A, B, and C, respectively. Thus the second search results finally returned to the client can achieve diversity and meet the diversity requirements for search results. The diversification process also implements optimization. Therefore there is less consumption of system resources, faster calculation, and more flexibility in the method as illustrated in this embodiment.

Figure 4:
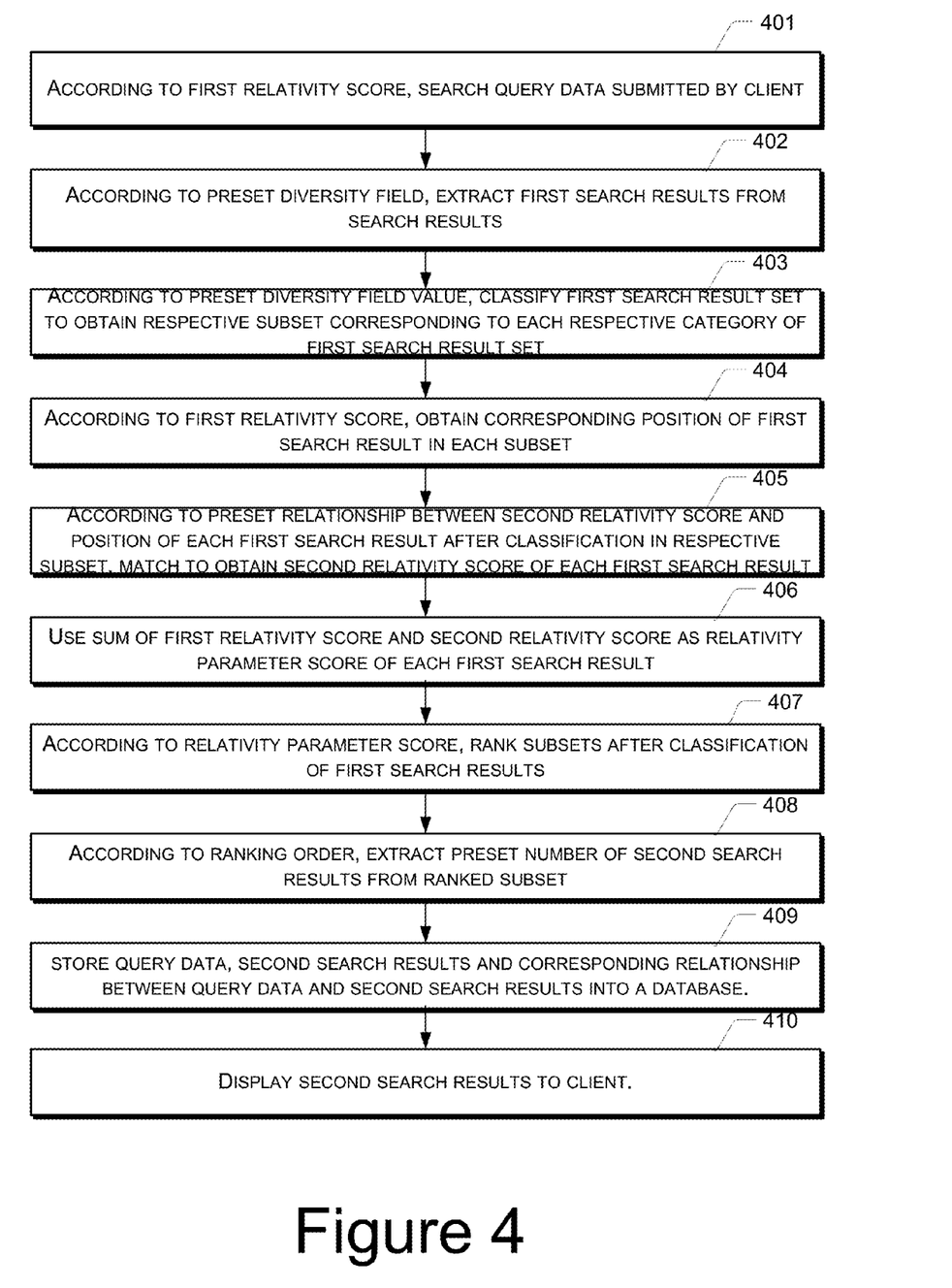
FIG. 4 illustrates an exemplary flowchart of a third embodiment of a search method in accordance with the present disclosure.

FIG. 4 illustrates a third embodiment of a search method according to the present disclosure. This embodiment can be understood as a detailed example that applies the search method of the present disclosure. The method is described below.

At 401, according to a first relevance score, the method conducts a search based on query data submitted by a client.

In this embodiment, after the search engine server obtains the first search result, it conducts search of the current query data according to the first relevance score.

At 402, according to a preset diversity field, the method extracts a first search result set from the search results.

The diversity field needs to be preset. For example, in the embodiment 2, the diversity field is preset as uid.

At 403, according to a preset diversity field value, the method classifies the first search result set to obtain a respective subset corresponding to each respective category of the first search result set.

According to the selected uid in the first search result set, all search results related to suppliers A, B, and C are used as a subset relating to uid of the first search results.

At 404, according to a first relevance score, the method obtains a corresponding position of a first search result in each subset.

At 405, according to a preset relationship between a second relevance score and a position of each first search result after classification in the respective subset, the method conducts a match to obtain the second relevance score of each first search result.

At 406, the method sums the first relevance score and the second relevance score to provide a relevance parameter score of each first search result.

At 407, according to the relevance parameter score, the method ranks the subsets after classification of the first search results.

At 408, according to a ranking order, the method extracts a preset number of second search results from the ranked subset.

The implementation process between the steps 404~408 can refer to descriptions in the embodiment 2.

At 409, the method stores the query data, the second search results and a corresponding relationship between the query data and the second search results into a database.

In this embodiment, after obtaining the user's current query data, the second search results, and the corresponding relationship between the query data and the second search results, the method stores such information in a database. A data table or any other permanent data structure, for example, can be used as the form to store such data.

At 410, the method displays the second search results to the client.

At the meantime, the second search results are presented to client. For example, only the top three second search results in the embodiment 2 may be displayed, e.g., A1, B2, and C2. Alternatively, all the search results in the subsets may be presented, such as A1~B1~C1~A2~A3~B2~B3~C2~C3.

In the interest of brevity, each of the aforementioned methods is described as a combination of a series of actions. However, one of ordinary skill in the art would appreciate that the present disclosure is not limited by any particular order of the actions because, according to the present disclosure, some steps can be performed in other orders or occur concurrently. In addition, one of ordinary skill in art would also appreciate that the embodiments in the present disclosure are preferred embodiments and some related steps or modules are not necessarily required by the present disclosure.

Figure 5:
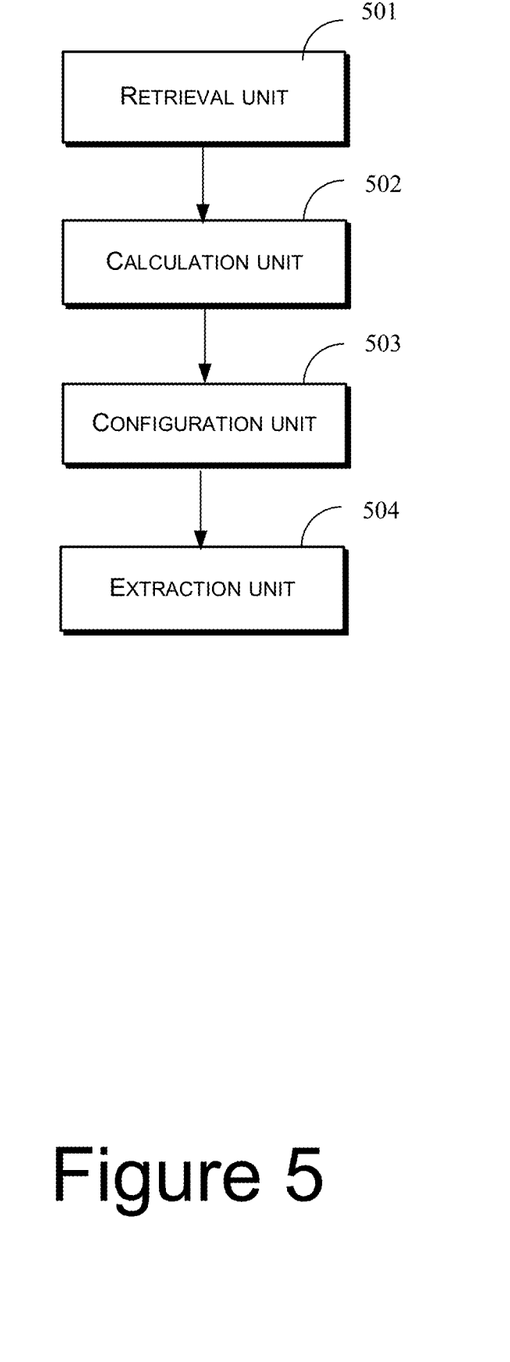
FIG. 5 illustrates an exemplary diagram of a first embodiment of a search system in accordance with the present disclosure.

Corresponding to the method as disclosed in the first embodiment of the present disclosure, by reference to FIG. 5, the present disclosure also provides a first embodiment of a search system. The system may include: a retrieval unit 501, a calculation unit 502, a configuration unit 503, and an extraction unit 504.

The retrieval unit 501 is configured to, according to query data submitted by a client, obtain a first search result set relevant to the query data.

In the search engine related technology field, a user's query is usually represented as symbol Query, and a result matching the Query is represented as Doc, and then a result set matching the Query is a Doc set represented as {Doc}.

The calculation unit 502 is configured to, according to a first relevance score and a preset diversity field of each first search result in the first search result set, calculates a second relevance score of each first search result. The preset diversity field represents an attribute category of a respective first search result.

After calculation of the Score 1 of each first search result in the first search result set, a second relative score (Score 2) needs to be calculated based on the preset diversity field and the Score 1. The preset diversity field represents the attribute category of the respective first search result, such as a uid (an identification of supplier) of each search result or geographical location information. The Score 2 is used to represent a score based on the Score 1 and ranking of each first search result under the diversity field.

The configuration unit 503 is configured to, according to the first relevance score and the second relevance score, generate a relevance parameter score of each first search result.

The detailed method to generate the relevance parameter score of each first search result may include: using a sum of the Score 1 and the Score 2 as the relevance parameter score of each first search result.

The extraction unit 504 is configured to, according to a preset number of one or more second search results and the relevance score, extract the one or more second search results from the first search result set to display to the client.

Here, assuming the diversity field is preset as uid, the parameters required in this embodiment may also include the preset number of second search results. The detailed preset number of second search results can be obtained by presetting the number of diversity values and the number of recurring extractions, e.g., by calculating a product of the preset number of diversity values and the number of recurring extractions to obtain the number of second search results to be extracted. The number of diversity values is used to represent the number of first search results with different uids to be extracted in the subsequent extracted second search results. For example, when the number of diversity values is 3, it represents 3 search results with different uids are to be extracted.

The system as described in the present embodiment can be integrated into a search engine server, or be an independent entity connected with a search engine server. It is noted that when a method or system disclosed in the present disclosure are implemented by software, it can be an additional function of the search engine server or have its own corresponding coding. The present disclosure does not limit the form of implementation of the disclosed methods or systems.

Figure 6:
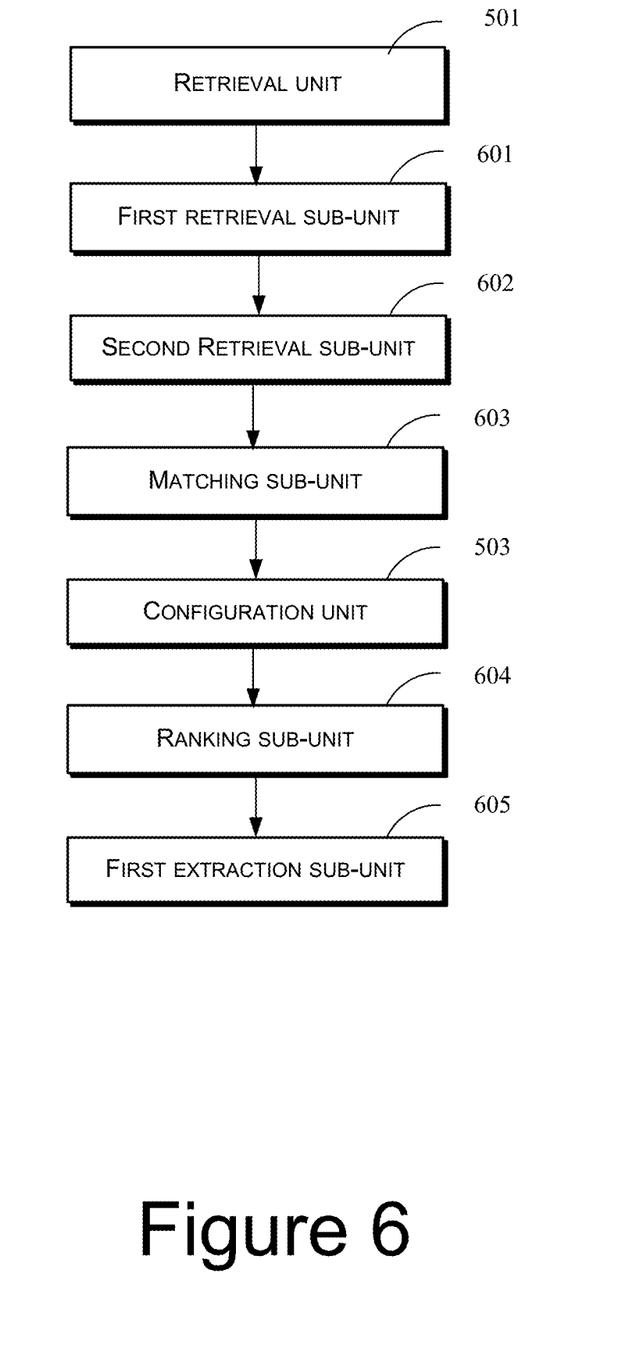
FIG. 6 illustrates an exemplary diagram of a second embodiment of a search system in accordance with the present disclosure.

Corresponding to the method as disclosed in the second embodiment of the present disclosure, by reference to FIG. 6, the present disclosure also provides a second preferred embodiment of a search apparatus. The apparatus may include: a retrieval unit 501, a first retrieval sub-unit 601, a second retrieval sub-unit 602, a matching sub-unit 603, a configuration unit 503, a ranking sub-unit 604, and a first extraction sub-unit 605.

The retrieval unit 501 is configured to, according to query data submitted by a client, obtain a first search result set relevant to the query data.

The first retrieval sub-unit 601 is configured to, according to a preset diversity field, classify the first search result set to obtain a respective subset corresponding to each respective category of the first search result set.

The second retrieval sub-unit 602 is configured to, according to a first relevance score in each subset, obtain a corresponding position of a respective first search result.

The matching unit 602 is configured to, according to a preset relationship between a second relevance score and a position of each of the first search results in each subset, conduct a match to obtain the second reality score of each of the first search results.

The configuration unit 503 is configured to, according to the first relevance score and the second relevance score, generate a relevance parameter score of each first search result.

A detailed method to generate the relevance parameter score of each first search result may include: summing the first relevance score and the second relevance score to provide the relevance parameter score of each first search result.

The ranking sub-unit 604 is configured to, according to the relevance parameter score, rank each subset after classification of the first search results.

The first extraction sub-unit 605 is configured to, according to a ranking order, extract a preset number of second search results from the ranked subsets, and to return the second search results to the client.

Figure 7:
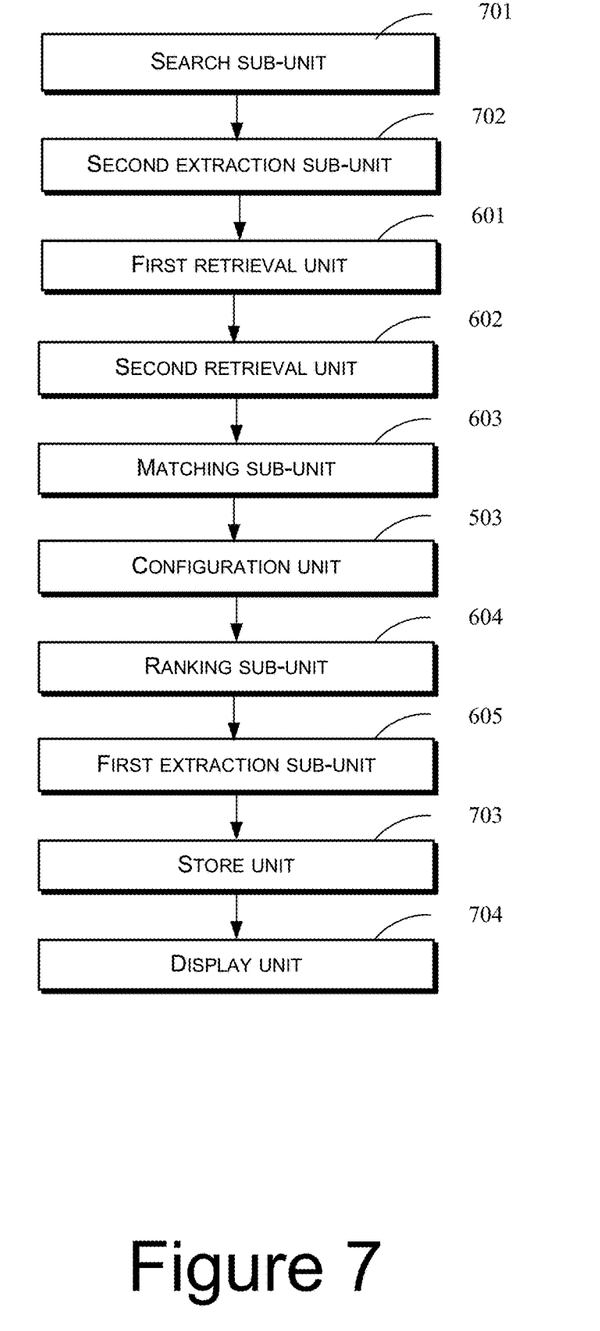
FIG. 7 illustrates an exemplary diagram of a third embodiment of a search system in accordance with the present disclosure.

Corresponding to the method as disclosed in the third embodiment of the present disclosure, by reference to FIG. 7, the present disclosure also provides a corresponding embodiment of a search system. The system may include: a search sub-unit 701, a second extraction sub-unit 702, a first retrieval sub-unit 601, a second retrieval sub-unit 602, a matching sub-unit 603, a configuration unit 503, a ranking sub-unit 604, a first extraction sub-unit 605, a store unit 703, and a display unit 704.

The search sub-unit 701 is configured to, according to a first relevance score, search query data submitted by a client.

The second extraction sub-unit 702 is configured to, according to a preset diversity field, extract first search results from search results.

The first retrieval sub-unit 601 is configured to, according to a preset diversity field value, classify the first search result set to obtain a respective subset corresponding to each respective category of the first search result set.

The second retrieval sub-unit 602 is configured to, according to a first relevance score of each subset, obtain a corresponding position of a first search result.

The matching sub-unit 603 is configured to, according to a preset relationship between a second relevance score and a position of each first search result after classification in the respective subset, conduct a match to obtain the second relevance score of each first search result.

The configuration unit 503 is configured to, according to the first relevance score and the second relevance score, generate a relevance parameter score of each first search result.

A detailed method to generate the relevance parameter score of each first search result may include: summing the first relevance score and the second relevance score to provide the relevance parameter score of each first search result.

The ranking sub-unit 604 is configured to, according to the relevance parameter score, rank each subset after classification of the first search results.

The first extraction sub-unit 605 is configured to, according to a ranking order, extract a preset number of second search results from the ranked subsets, and return the second search results to the client.

The storing unit 703 is configured to store the query data, the second search results and a corresponding relationship between query data and the second search results into a database.

The display unit 704 is configured to display the second search results to the client.

The various exemplary embodiments are progressively described in the present disclosure. Same or similar portions of the exemplary embodiments can be mutually referenced. Each exemplary embodiment has a different focus than other exemplary embodiments. For example, the exemplary apparatus embodiment has been described in a relatively simple manner because of its fundamental correspondence with the exemplary method. Details thereof can be referred to corresponding portions of the exemplary method.

Finally, it is noted that any relational terms such as "first" and "second" in this document are only meant to distinguish one entity from another entity or one operation from another operation, but not necessarily request or imply existence of any real-world relationship or ordering between these entities or operations. Moreover, it is intended that terms such as "include", "have" or any other variants mean non-exclusively "comprising". Therefore, processes, methods, articles or devices which individually include a collection of features may not be limited to those features, but may also include other features that are not listed, or any inherent features of these processes, methods, articles or devices. Without any further limitation, a feature defined within the phrase "include a . . . " does not exclude the possibility that process, method, article or device that recites the feature may have other equivalent features.

The search methods and systems provided in the present disclosure have been described in details above. The above exemplary embodiments are employed to illustrate the concept and implementation of the present disclosure. The exemplary embodiments are provided to facilitate understanding of the techniques and respective core concepts of the present disclosure. Based on the concepts of this disclosure, one of ordinary skill in the art may make modifications to the practical implementation and application scopes. In conclusion, the content of the present disclosure shall not be interpreted as limitations of this disclosure.

What is claimed is:

1. A method implemented by one or more computers, the method comprising:
   obtaining a plurality of search results for a query based on first relevance scores;
   classifying the plurality of search results into a plurality of classifications;
   generating second relevance scores for the plurality of search results based on respective rankings of the plurality of search results in corresponding classifications of the plurality of classifications; and
   ranking the plurality of search results based on the first relevance scores and the second relevance scores.

2. The method of claim 1, further comprising extracting a preset number of search results from the plurality of search results.

3. The method of claim 2, wherein the preset number of search results comprises at least one search result from each classification of the plurality of classifications.

4. The method of claim 2, wherein the query is received from a client, and the method further comprises providing the preset number of search results to the client for display.

5. The method of claim 2, further comprising storing the query, the preset number of search results, and a corresponding relationship between the query and the preset number of search results into a database.

6. The method of claim 2, wherein the preset number is determined based on a number of the plurality of classification.

7. The method of claim 1, wherein the plurality of classifications comprise a plurality of attribute categories or a plurality of geographical locations.

8. One or more storage devices storing executable instructions that, when executed by one or more computers, instruct the one or more computers to perform acts comprising:
   obtaining a plurality of search results for a query based on first relevance scores;
   classifying the plurality of search results into a plurality of classifications;
   generating second relevance scores for the plurality of search results based on respective rankings of the plurality of search results in corresponding classifications of the plurality of classifications; and
   ranking the plurality of search results based on the first relevance scores and the second relevance scores.

9. The one or more storage devices of claim 8, the acts further comprising extracting a preset number of search results from the plurality of search results.

10. The one or more storage devices of claim 9, wherein the preset number of search results comprises at least one search result from each classification of the plurality of classifications.

11. The one or more storage devices of claim 9, wherein the query is received from a client, and the method further comprises providing the preset number of search results to the client for display.

12. The one or more storage devices of claim 9, further comprising storing the query, the preset number of search results, and a corresponding relationship between the query and the preset number of search results into a database.

13. The one or more storage devices of claim 9, wherein the preset number is determined based on a number of the plurality of classification.

14. The one or more storage devices of claim 8, wherein the plurality of classifications comprise a plurality of attribute categories or a plurality of geographical locations.

15. A system comprising:
   one or more processors;
   storage media storing executable instructions that, when executed by the one or more processors, cause the one or more processors to perform acts comprising:
      obtaining a plurality of search results for a query based on first relevance scores;
      classifying the plurality of search results into a plurality of classifications;
      generating second relevance scores for the plurality of search results based on respective rankings of the plurality of search results in corresponding classifications of the plurality of classifications; and
      ranking the plurality of search results based on the first relevance scores and the second relevance scores.

16. The system of claim 15, the acts further comprising extracting a preset number of search results from the plurality of search results.

17. The system of claim 16, wherein the preset number of search results comprises at least one search result from each classification of the plurality of classifications.

18. The system of claim 16, wherein the query is received from a client, and the method further comprises providing the preset number of search results to the client for display.

19. The system of claim 16, further comprising storing the query, the preset number of search results, and a corresponding relationship between the query and the preset number of search results into a database.

20. The system of claim 15, wherein the plurality of classifications comprise a plurality of attribute categories or a plurality of geographical locations.

* * * * *